United States Patent [19]
Selby

[11] Patent Number: 6,039,066
[45] Date of Patent: Mar. 21, 2000

[54] SAFETY HOSE SYSTEM

[76] Inventor: William J. Selby, 1530 West Dr., Stoughton, Mass. 02072

[21] Appl. No.: 09/205,393

[22] Filed: Dec. 4, 1998

[51] Int. Cl.[7] .................. F16L 9/18; F16L 55/16
[52] U.S. Cl. .............. 137/312; 73/40.5 R; 73/49.1; 137/375; 137/551; 138/104; 138/114; 138/145; 222/108; 285/13; 285/123.1
[58] Field of Search .................. 73/40.5 R, 46, 73/49.1; 137/312, 375, 551; 138/104, 113, 114, 145; 141/86, 88; 222/108; 285/13, 123.1

[56] References Cited

U.S. PATENT DOCUMENTS

| | | | |
|---|---|---|---|
| 2,838,074 | 6/1958 | Lauck | 138/114 |
| 4,570,686 | 2/1986 | Devine | 138/114 |
| 4,930,549 | 6/1990 | Renner | 137/312 |
| 5,156,190 | 10/1992 | Staley, Jr. | 138/104 |
| 5,411,777 | 5/1995 | Steele et al. | 138/104 |
| 5,427,155 | 6/1995 | Williams | 138/104 |
| 5,531,357 | 7/1996 | Guilmette | 138/103 |
| 5,713,387 | 2/1998 | Armenia et al. | 137/312 |
| 5,771,916 | 6/1998 | Armenia et al. | 137/67 |
| 5,884,657 | 3/1999 | Srock | 138/114 |
| 5,911,155 | 6/1999 | Webb | 138/113 |
| 5,931,184 | 8/1999 | Armenia et al. | 138/114 |

FOREIGN PATENT DOCUMENTS

| | | | |
|---|---|---|---|
| 2552508 | 5/1977 | Germany | 138/104 |

*Primary Examiner*—George L. Walton
*Attorney, Agent, or Firm*—Steven N. Fox, Esq.

[57] ABSTRACT

A safety hose system for use in delivering water from a water supply source to an inlet connector of a washing machine. In one embodiment, the system comprises a first connector engageable with the inlet connector of the washer machine and a second connector engageable with the water supply source. The system further comprises first hose having a first and seconds end connected to first and second connector, respectively. The system further comprises a second hose concentrically and sealed about the first hose and extending from said first connector to said second connector. The system further comprises an over-spill portion formed by said second hose being disposed within said first hose. The over-spill comprises a water reactive material which will change the color of any water entering into the over-spill portion, The system further comprises a third hose engaged with the second hose and in communication with the over-spill space. The third hose is made from a transparent material such that the color of any water passing there through can be visually observed. In operation, if the first hose should become damaged any water flowing through the first hose will be passed into the over-spill space and into the third hose where it is safely discarded.

1 Claim, 1 Drawing Sheet

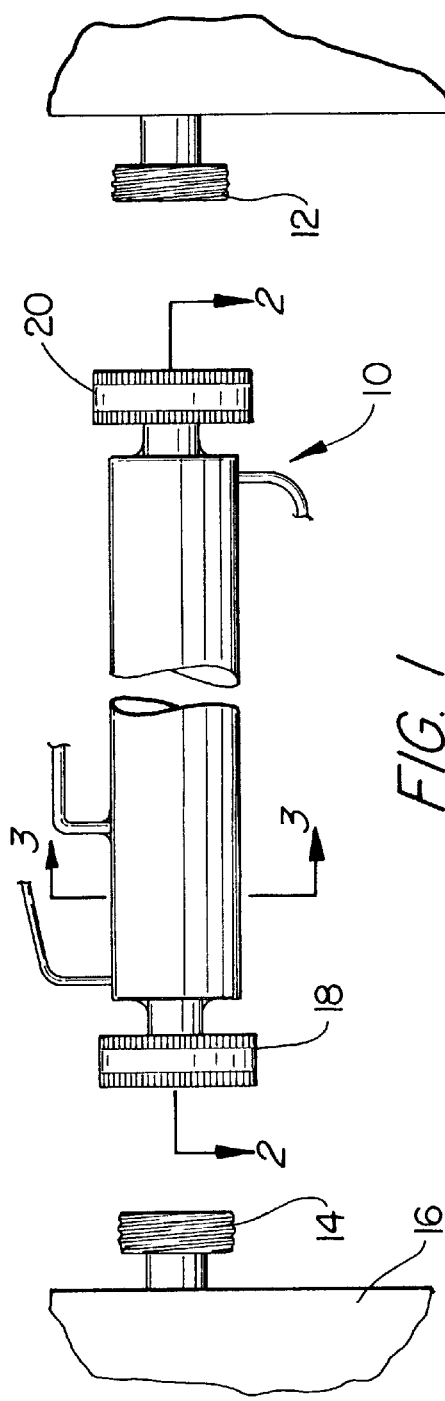
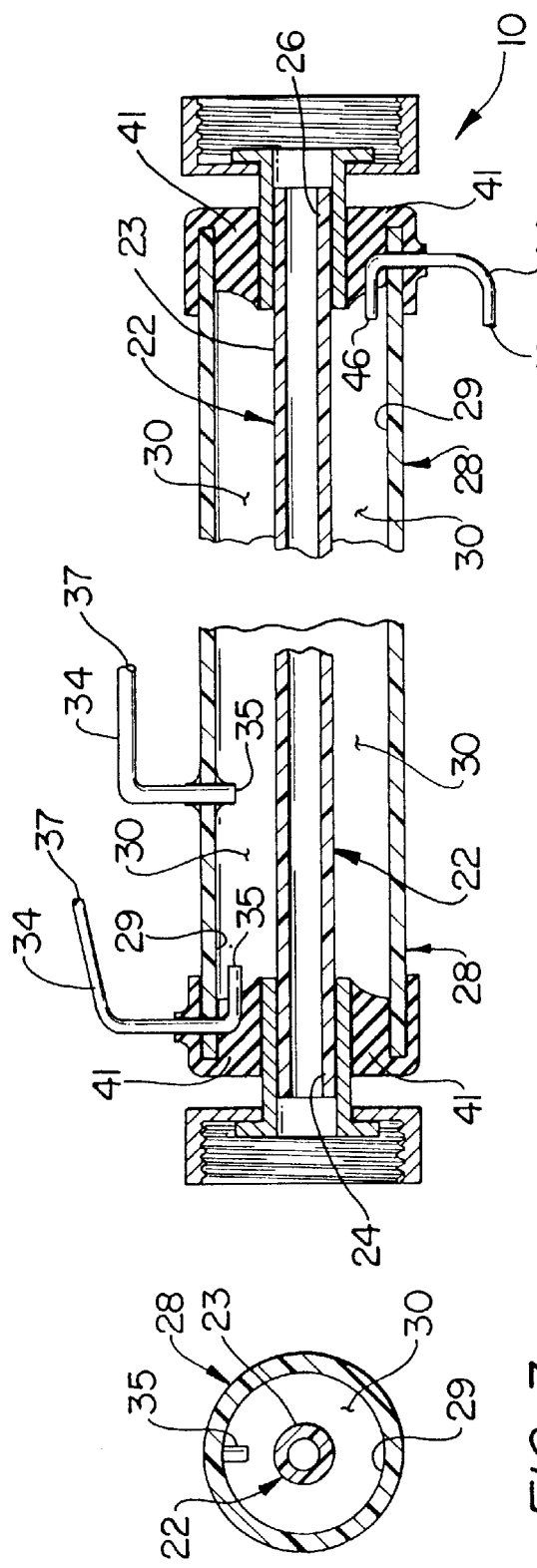

SAFETY HOSE SYSTEM

FIELD OF THE INVENTION

The present invention relates generally to a system for delivering hot water from a water supply source to a washer machine.

BACKGROUND OF THE INVENTION

Washer machines are commonly used to wash clothing. Conventional washer machines have a inlet connector to receive hot water from a supply source such as a hot water feed-line installed in the home. In common practice, the inlet connector of the washer machine is typically connected to the hot water supply source by a flexible hose assembly having a single hose made from a synthetic polymer such as rubber. Over time the flexible hose will degrade and upon complete failure hot water flowing therein is expelled into the outside environment which is typically a floor of a home. In the case of a basement, leakage of hot water typically causes more of an inconvenience than damage. However, in recent years more and more washer machines are being located and used on floors which have occupied spaces below. As such, leakage of water can cause significant property damage to the floor and the occupied space below.

SUMMARY OF THE INVENTION

The principal object of the present invention is to provide a safety hose system that can be safely used to supply hot water from a hot water supply source to a washer machine.

The present invention is a safety hose system for use in delivering water from a water supply source to an inlet connector of a washing machine. In one embodiment, the system comprises a first connector engageable with the inlet connector of the washer machine and a second connector engageable with the water supply source. The system further comprises first hose having a first and seconds end connected to first and second connector, respectively. The system further comprises a second hose concentrically and sealed about the first hose and extending from said first connector to said second connector. The system further comprises an over-spill portion formed by said second hose being disposed within said first hose. The over-spill comprises a water reactive material which will change the color of any water entering into the over-spill portion, The system further comprises a third hose engaged with the second hose and in communication with the over-spill space. The third hose is made from a transparent material such that the color of any water passing there through can be visually observed. In operation, if the first hose should become damaged any water flowing through the first hose will be passed into the over-spill space and into the third hose where it is safely discarded.

BRIEF DESCRIPTION OF THE DRAWINGS

The following description of the invention will be better understood with reference to the accompanying drawings in which:

FIG. 1 is a perspective view of the present invention showing a firs embodiment of the safety hose system FIG. 2 is a cross-section view taken along line A—A of FIG. 1; and FIG. 3 is a cross-section view taken along line B—B of FIG. 1.

DETAILED DESCRIPTION OF THE PREFERRED EMBODIMENTS

Referring to FIGS. 1–3, wherein the present invention is a safety hose system 10 for use in delivering hot water from a water supply source 12 to an inlet connector 14 of a washing machine 16. In one embodiment, the system 10 comprises a first connector 18 secured by to the inlet connector 14 of the washer machine 16 by conventional means and a second connector 20 engageable with the water supply source 12 by conventional means. The system 10 further comprises a first hose 22 having a first end 24 and a second end 26 which are connected to first connector 18 and the second connector 20, respectively, by conventional means such as crimping. The first hose 22 is made from a synthetic polymer such as rubber. The system 10 further comprises a second hose 28 disposed concentrically about the first hose 22 and extending from the first connector 18 to the second connector 20. The ends of the second hose 28 are sealed with a sealing material 41 to the first and connectors 18 and 20, respectively. The second hose 28 is made from a flexible polymer material that is compatible with bonding processes which will allows it to be easily bonded with another compatible polymer material and bend without becoming kinked and/or otherwise damaging the second hose 28. In the preferred embodiment the sealing material is made from a synthetic polymer such as rubber and may be formed as part of an injection molding process. The system 10 further comprises an over-spill portion 30 formed by the second hose 28 being concentrically disposed and sealed about the first hose 22. The over-spill portion 30 comprises a water reactive material 32 which will change the color of any water entering into the over-spill portion 30. The water reactive material 32 may be in the form of pellets disposed in the over-spill space and/or a coating applied to the exterior wall 23 of the first hose 18 and the interior wall 29 of the second hose 20. The system 10 further comprises a third hose 34 having a first end 35 engaged with the second hose 28 and in communication with the over-spill portion 30 and a second end 37 which may be engaged with a water discharge port such as those typically found in most homes. The third hose 34 is made from a transparent material such that the color of any water passing there through can be visually observed. Alternatively or in addition to, the second hose 34 may be connected to the second hose 28 and over-spill portion 30 by being formed as part of the sealing material 41. In operation, if the first hose 18 should become damaged any water flowing therein will be passed into the over-spill portion 30 and into the third hose 34 where it can be safely discarded.

In a second embodiment, the system 10 may comprise a fourth hose 44 having a first end 46 engaged with the second hose 28 and in communication with the over-spill portion 30 and a second end 48 which may be engaged with a water discharge port such as those typically found in most homes. The fourth hose 44 may be used to increase the discharge capacity to handle any over-flow of hot water not being discharged by the third hose 34 thereby eliminating the build-up of back pressure and possible damage to the second hose 28.

In a third embodiment, the system 10 may comprise heat shrinkable material disposed about the ends portions second hose 28 and the sealing material 412 to thereby add strength and a further moisture and air barrier.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A safety hose system for use in delivering water from a water supply source to an inlet connector of a washing machine:

(a) a first connector engageable with the inlet connector of the washer machine;
(b) a second connector engageable with the water supply source;
(c) a first hose having a first end and a second end, said first and second ends of said inner hose being engaged with said first and second connector, respectively;
(d) a second hose concentrically disposed and sealed about said first hose and extending from said first connector to said second connector;
(e) an over-spill portion formed by said second hose being disposed within said first hose, said over-spill comprising a water reactive material which will change the color of any water entering into said over-spill portion; and
(f) a third hose engaged with said second hose and in communication with said over-spill space, said third hose being made from a transparent material such that the color of any water passing through the third hose can be visually observed;

whereby if said first hose should become damaged any water flowing through said first hose will be passed into said over-spill space and into said third hose where the water can be safely discarded.

* * * * *